(12) United States Patent
Ichihara

(10) Patent No.: US 8,314,680 B2
(45) Date of Patent: Nov. 20, 2012

(54) VEHICLE DOOR LOCK CONTROL APPARATUS

(75) Inventor: Masaaki Ichihara, Gifu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 805 days.

(21) Appl. No.: 12/281,389

(22) PCT Filed: Oct. 2, 2007

(86) PCT No.: PCT/JP2007/069296
§ 371 (c)(1),
(2), (4) Date: Sep. 2, 2008

(87) PCT Pub. No.: WO2008/041707
PCT Pub. Date: Apr. 10, 2008

(65) Prior Publication Data
US 2009/0033459 A1  Feb. 5, 2009

(30) Foreign Application Priority Data
Oct. 3, 2006 (JP) ................................. 2006-271993

(51) Int. Cl.
*G06F 7/04* (2006.01)
(52) U.S. Cl. ...................... 340/5.31; 340/5.28; 340/5.72
(58) Field of Classification Search .................. 340/426,
340/990, 995, 825.57, 430, 5.2, 5.31, 5.28,
340/5.72; 701/1, 29; 342/357.07, 357.13;
713/201
See application file for complete search history.

(56) References Cited

U.S. PATENT DOCUMENTS

| 5,912,631 | A | * | 6/1999 | Kusunoki | 340/5.64 |
| 5,986,543 | A | * | 11/1999 | Johnson | 340/426.19 |
| 6,384,709 | B2 | * | 5/2002 | Mellen et al. | 340/5.2 |
| 6,831,597 | B2 | * | 12/2004 | Sasaki et al. | 342/357.46 |
| 6,922,616 | B2 | * | 7/2005 | Obradovich et al. | 701/1 |
| 7,051,196 | B2 | * | 5/2006 | Angelo et al. | 713/1 |
| 2002/0173887 | A1 | * | 11/2002 | Flick | 701/29 |
| 2006/0112428 | A1 | * | 5/2006 | Etelapera | 726/16 |
| 2009/0033459 | A1 | * | 2/2009 | Ichihara | 340/5.28 |

FOREIGN PATENT DOCUMENTS

| DE | 44 15 019 C1 | 4/1995 |
| DE | 195 29 742 A1 | 2/1997 |
| DE | 10 2004 047 809 A1 | 1/2006 |
| EP | 0 758 738 A2 | 2/1997 |
| EP | 1 176 064 A1 | 1/2002 |
| JP | 62-37479 A | 2/1987 |
| JP | 06-108726 | 4/1994 |

(Continued)

*Primary Examiner* — Jennifer Mehmood
*Assistant Examiner* — Kaleria Knox
(74) *Attorney, Agent, or Firm* — Kenyon & Kenyon LLP

(57) ABSTRACT

A disclosed vehicle door lock control apparatus mounted in a vehicle for locking and unlocking the closed doors includes an automatic door locking unit locking the doors when no operation of opening a vehicle door is detected within a prescribed period of time-out time after the doors are unlocked by the user; and a time-out time determining unit determining the prescribed period of time-out time based on own vehicle position information. The time-out time determining unit, when the user requests to unlock the doors within a prescribed time after the doors are locked by the automatic door locking unit, learns that the prescribed period of time-out time with respect to an own vehicle position is to be extended.

8 Claims, 2 Drawing Sheets

FOREIGN PATENT DOCUMENTS

| | | |
|---|---|---|
| JP | 07-052751 | 2/1995 |
| JP | 2000-234462 A | 8/2000 |
| JP | 2003-102068 A | 4/2003 |
| JP | 2004-143662 A | 5/2004 |
| JP | 2006-113876 A | 4/2006 |

* cited by examiner

VEHICLE DOOR LOCK CONTROL APPARATUS

This is a 371 national phase application of PCT/JP2007/069296 filed 2 Oct. 2007, which claims priority to Japanese Patent Application No. 2006-271993 filed 3 Oct. 2006, the contents of which are incorporated herein by reference.

TECHNICAL FIELD

The present invention generally relates to a vehicle door lock control apparatus mounted in a vehicle for locking and unlocking the closed doors according to a user's operation, and particularly to a vehicle door lock control apparatus achieving a good balance between assurance of the security of the vehicle and the user's convenience.

BACKGROUND ART

Conventionally, there has been known a vehicle door lock control apparatus mounted in a vehicle for locking and unlocking the closed doors according to a user's operation (see, for example, Patent Documents 1 and 2).

Patent Documents 1 and 2 disclose an apparatus for driving and controlling the door lock mechanism to change the status of the vehicle's doors from locked to unlocked when a door lock signal is received from a wireless key and automatically change the status of the vehicle's doors from unlocked to locked in consideration of the vehicle security when the vehicle's door is not opened even after a prescribed time-out time has passed since the wireless door unlock operation has been completed.

Further, Patent Document 1 describes that the prescribed time-out time from the wireless door unlock operation to the automatic door locking as described above is changed according to the situation.

More specifically, Patent Document 1 describes that 1) when the elapsed time from when the doors are locked until the doors are next unlocked is less than a prescribed time, it is determined that the user is getting out of the vehicle and the door unlock operation is an erroneous operation, so the above elapsed time is set shorter; and 2) when the elapsed time from when the doors are locked until the doors are next unlocked is longer than the prescribed time, it is determined that the user is getting in the vehicle, and the above elapsed time is set longer (see, for example, paragraphs [0028] through [0032]).

[Patent document 1] Japanese Patent Application Publication No. H6-108726

[Patent document 2] Japanese Patent Application Publication No. H7-052751

DISCLOSURE OF THE INVENTION

Problem to be Solved by the Invention

As a conventional apparatus described in Patent Document 2, in a case where the time-out time from when the doors are unlocked until the doors are automatically locked is fixed, and when the time-out time is set comparatively shorter in consideration of ensuring the security of the vehicle, the doors are automatically locked soon after the doors are unlocked. As a result, a user may feel inconvenienced because the user needs to unlock the doors again.

On the other hand, in a case where the time-out time is set longer in view of avoiding imposing a feeling of inconvenience on the user, an allowable time when the vehicle doors are unlocked carelessly becomes longer, which is not preferable in consideration of the assurance of the security of the vehicle.

In this respect, as in the conventional apparatus described in Patent Document 1, it can be said that it is preferable that the directions where the time-out time from when the doors are unlocked until the door is automatically locked be provided as variable.

However, the probability of suffering damage such as theft when the vehicle doors are kept unlocked carelessly is thought to vary greatly depending on the vehicle parking position (and its ambient environment) at the time.

For example, when a case where a vehicle is parked in the area of the house is compared with a case where the vehicle is parked on a road in a downtown area, it can be said that the probability of suffering damage such as theft in the latter case is relatively high. In other words, in the former case, the vehicle doors are allowed to be kept unlocked carelessly for a longer time. Further, it can even be said that it is preferable from a viewpoint of the convenience of the users that the vehicle doors are not to be automatically locked for a while after the doors are unlocked in a case where, for example, a user loads and unloads baggage into and from the vehicle, respectively.

In the conventional apparatus described in Patent Document 1, there is no consideration made for the vehicle parking position and its ambient environment, and it is determined whether a first fixed time period or a second fixed time period longer than the first fixed time period is applied to the time-out time from when the doors are unlocked until the doors are automatically locked based on the terms of the elapsed time from when the doors are locked until the doors are unlocked.

When such a fixed time-out time is used as described above, there may be some likelihood that the security of a vehicle is not sufficiently ensured depending on the vehicle parking position and an impression that the time until the door is automatically locked is too short is given to a user.

More specifically, according to the description of Patent Document 1, in a case when a vehicle is parked in, for example, a downtown area, even when the shorter time-out time is being used, the security of the vehicle may not be sufficiently ensured. On the other hand, in a case where a vehicle is parked in the area of a house, even when the longer time-out time is being used, an impression that the time until the door is automatically locked is too short may be given to the user.

As described above, such conventional apparatus as described in Patent Documents 1 and 2 cannot achieve a good balance between assurance of the security of the vehicle and the user's convenience.

The present invention is made to solve the problems and a primary object of the present invention is to provide a vehicle door lock control apparatus capable of achieving a good balance between assurance of the security of the vehicle and the user's convenience.

Means for Solving Problem

To achieve the above object, according to an aspect of the present invention, there is provided a vehicle door lock control apparatus mounted in a vehicle for locking and unlocking the closed doors according to a user's operation (such as a wireless key operation and a mechanical key operation), including an automatic door locking unit locking the doors when no operation of opening the vehicle door is detected within a prescribed period of time-out time after the doors are unlocked by the user; and a time-out time determining unit determining the prescribed period of time-out time based on own vehicle position information.

In the above aspect of the present invention, the time-out time determining unit, for example, checks the own vehicle position information against map information so as to estimate a required security level at the position, and determines the prescribed period of time-out time based on the estimated security level. More specifically, the time-out time determining unit previously classifies the map information into plural area types depending on the differences of the security levels, assigns a different time period value to each of area types, specifies the area type with respect to the position by checking the own vehicle position information against the map information, and determines the prescribed period of time-out time by reading the time period value assigned to the specified area type.

Further, in the above aspect of the present invention, when the user operation is a wireless key operation, the user requests to lock or unlock the doors by a wireless key operation, the automatic door locking unit locks the doors when no operation for opening the vehicle doors within a prescribed period of time-out time after the doors are unlocked based on the request from the user, and the time-out time determining unit determines the prescribed period of time-out time based on the own vehicle position information.

According to the above aspect of the present invention, the period of time-out time from when the doors are unlocked until the doors are automatically locked is determined according to the position of the vehicle. Therefore, by determining the period of time-out time so as to secure the necessary and sufficient security corresponding to the ambient environment of the vehicle position, it becomes possible to achieve a good balance between assurance of the security of the vehicle and the user's convenience.

Still further, in the above aspect of the present invention, preferably the time-out time determining unit, when the user unlocks the door within a prescribed period of time after the doors are locked by the automatic door locking unit, memorizes an own vehicle position at the time as a position whose prescribed time-out time is to be extended. Also, preferably, the time-out time determining unit sets the prescribed period of time-out time when it is determined that the own vehicle is positioned in a prescribed area including the position whose prescribed time-out time is to be extended based on the own vehicle position information longer than that when it is determined that the own vehicle is in an area other than the prescribed area based on the own vehicle position information.

Still further, in the above aspect of the present invention, the time-out time determining unit determines the prescribed period of time-out time when, for example, the user unlocks the doors. In this case, the time-out time determining unit may set the prescribed period of time-out time when it is determined that the user unlocks the doors in daytime longer than that when it is determined that the user unlocks the doors in nighttime.

Still further, in the above aspect of the present invention, for example, the time-out time determining unit detects an own vehicle position and generates the own vehicle position information. In this case, the time-out time determining unit may detect an own vehicle position when a user unlocks the doors and generate the own vehicle position information.

Effect of the Invention

According to an embodiment of the present invention, it is possible to provide a vehicle door lock control apparatus capable of achieving a good balance between assurance of the security of the vehicle and the user's convenience.

EXPLANATION OF LETTERS AND NUMERALS

Figure 1:
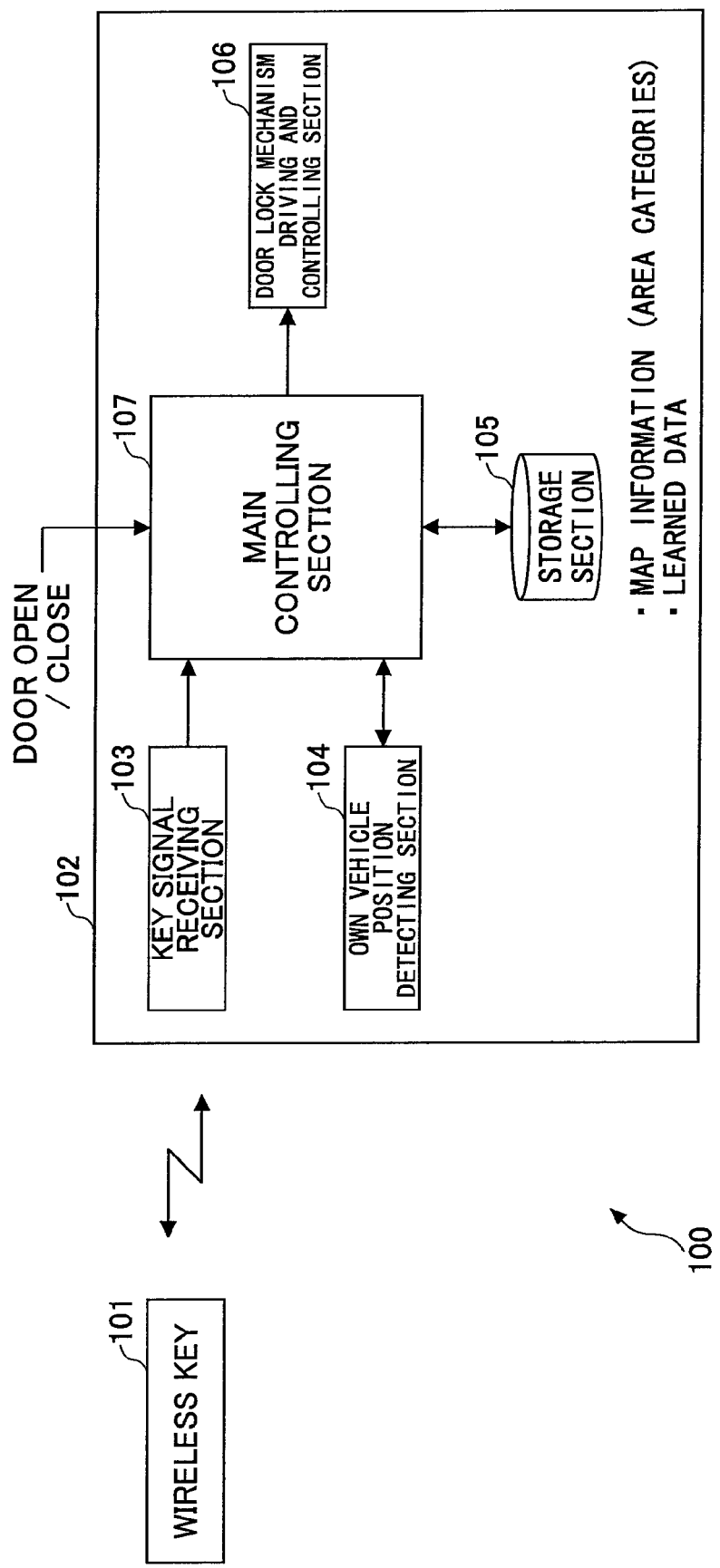
FIG. 1 is a schematic drawing showing a configuration of a wireless door lock control system according to an embodiment of the present invention.

100: Wireless door lock control system
101: Wireless key
102: Door lock control apparatus
103: Key signal receiving section
104: Own vehicle position detecting section
105: Storage section
106: Door lock mechanism driving and controlling section
107: Main controlling section

BEST MODE FOR CARRYING OUT THE INVENTION

In the following, a best mode for carrying out a embodiment of the preferred embodiment is described with reference to the accompanying drawings. In the embodiment described below, as an example, it is assumed that a wireless key system capable of locking and unlocking the doors in accordance with the operations of the wireless key is employed.

It should be noted that the basic concept, a main hardware configuration, an operating principle, and basic controlling method of the vehicle door lock control apparatus capable of locking and unlocking the closed doors in accordance with the user's operations are known to persons skilled in the art and therefore, the descriptions thereof are omitted.

EMBODIMENT

In the following, an in-vehicle wireless door lock control system according to an embodiment of the present invention is described with reference to FIGS. 1 and 2.

Figure 2:
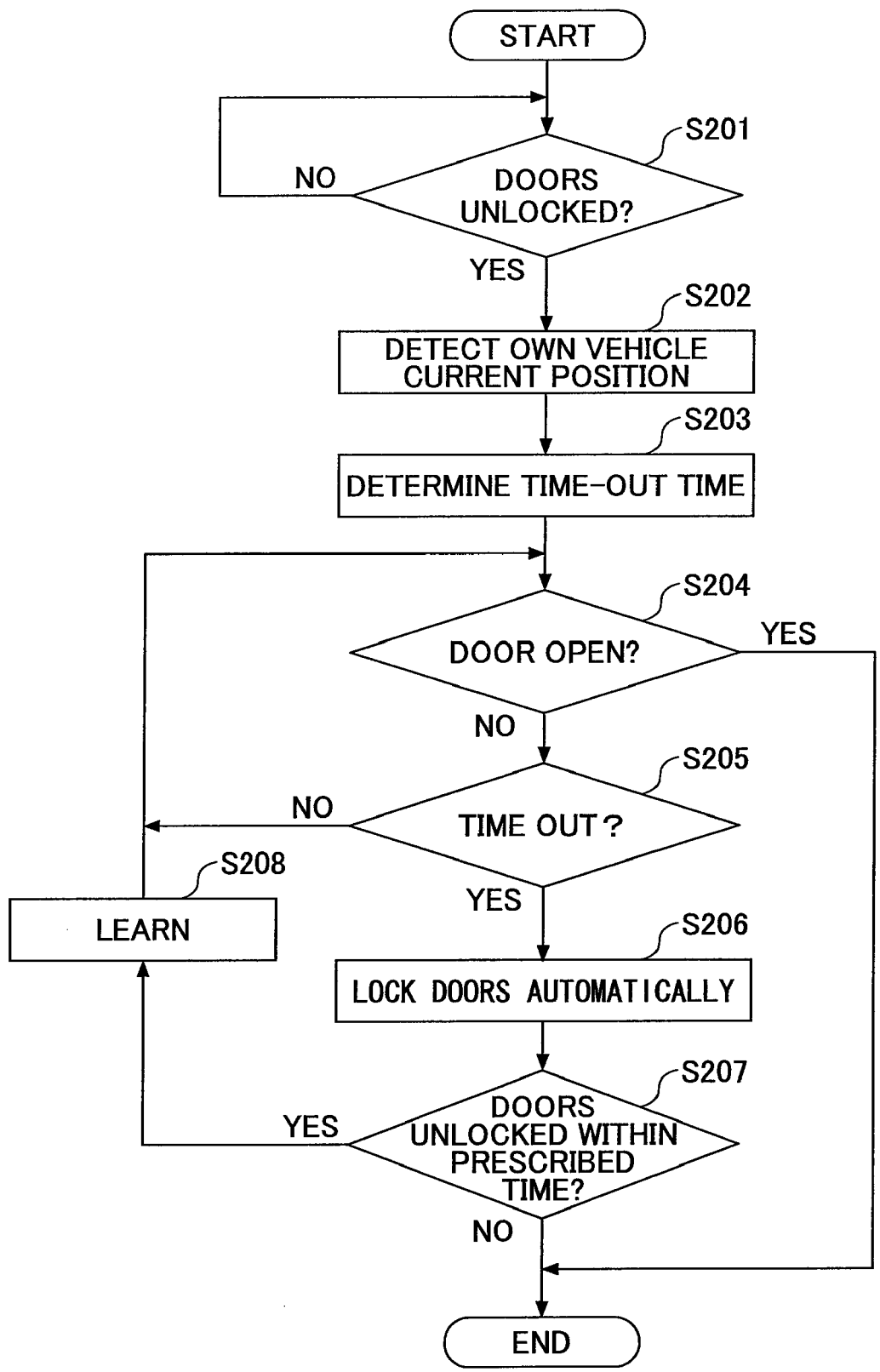
FIG. 2 is a flowchart showing an automatic door locking process of the wireless door lock control system according to an embodiment of the present invention.

FIG. 1 is a schematic drawing showing a configuration of an in-vehicle wireless door lock control system 100 according to an embodiment of the present invention.

The wireless door lock control system 100 according to an embodiment of the present invention includes a wireless key 101 carried by a user and transmitting a door lock/unlock wireless signal based on prescribed operations (such as pressing down a prescribed button), and a door lock control apparatus 102 mounted in a vehicle to be controlled (not shown).

The door lock control apparatus 102 generally includes 1) a wireless door lock/unlock function for locking the vehicle doors of the own vehicle when the door lock signal transmitted from the wireless key is received and unlocking the vehicle of the own vehicle when the door unlock signal transmitted from the wireless key is received, and 2) an automatic doors lock function for automatically (namely, without depending on the user's operation) locking the doors for ensuring the security of the vehicle when an opening operation of the vehicle door is not detected after a prescribed time has passed since the doors have been unlocked wirelessly.

The door lock control apparatus 102 includes a key signal receiving section 103 for receiving a door lock wireless signal and a door unlock wireless signal transmitted from the wireless key. Upon receiving the door lock/unlock wireless signal transmitted from the wireless key, the key signal receiving section 103 transmits the request of the door lock/unlock from the user to a main controlling section 107.

The door lock control apparatus 102 further includes an own vehicle position detecting section 104 for detecting the position of the own vehicle using, for example, the GPS (Global Positioning System). It is preferable that the detection accuracy (resolution) of the own vehicle position detecting section 104 be as high (fine) as possible. It is preferable when a high-accuracy GPS such as the RTK (Real Time Kinetic)-GPS is employed.

The door lock control apparatus 102 further includes a storage section 105 for previously storing and holding map information. The storage section 105 may be any type of standard recording medium. Preferably, the map information stored and held in the storage section 105 can be arbitrarily updated to include the latest version/contents using, for example, communications. Further, it is assumed that learned data described below are successively stored and held in the storage section 105.

The door lock control apparatus 102 further includes a door lock mechanism controlling section 106 for driving and controlling a door lock mechanism to lock or unlock the closed own vehicle doors in accordance with an instruction of the main controlling section 107 described below.

The door lock control apparatus 102 further includes the main controlling section 107 for collectively controlling each of the elements in the door lock control apparatus 102. In this embodiment, the main controlling section 107 may be, for example, a body ECU (Electronic Control Unit). Further, in this embodiment, it is assumed that open/close operation information of the own vehicle doors is input into the main controlling section 107.

In the door lock control apparatus 102 having the above configuration, the main controlling section 107 changes the period of the time-out time from when the doors are unlocked wirelessly until the vehicle doors are automatically locked when no opening operation of the door is detected in accordance with a required security level in the own vehicle current position.

Herein, the term "required security level" refers to a level representing how much security is required to prevent the vehicle from, for example, being stolen in light of the current position and the ambient environment. In this embodiment, it is assumed that the higher the "required security level" is, the shorter is the period of the time allowed for leaving the vehicle doors carelessly unlocked.

In this embodiment, it is also assumed that the map information stored and held in the storage section 105 is previously classified into plural area categories in accordance with the required security levels so as to avoid judging the security level in such positions every time the doors are unlocked wirelessly.

As an example of the classified categories, it can be thought that the map information may be classified into category 1: a nearby area of the user's own house; category 2: station vicinity areas; category 3: downtown areas; and category 4: other areas.

In the storage section 105, the relationships between each of the area categories and the corresponding period of the time-out time previously set in accordance with the security level estimated with respect to each of the area categories are stored and held in the storage section 105 in, for example, a table format.

A flow of the automatic door locking process in the door lock control apparatus 102 having the above configuration is next described with reference to the flowchart in FIG. 2.

First, the main controlling section 107 determines whether the key signal receiving section 103 receives the door unlock wireless signal transmitted from the wireless key (S201).

When it is determined that the key signal receiving section 103 receives the door unlock wireless signal transmitted from the wireless key (YES in S201), the main controlling section 107 gives an instruction to the door lock mechanism driving and controlling section 106 to unlock the vehicle doors and also gives an instruction to the own vehicle position detecting section 104 to detect the own vehicle position (S202).

After the own vehicle current position is detected (for example as the latitude and longitude information) by the own vehicle position detecting section 104, the main controlling section 107 specifies the area category including the own vehicle current position by checking the detected own vehicle current position against the map information previously stored and held in the main controlling section 107, and then determines the period of the time-out time from when the doors are unlocked wirelessly until the doors are automatically locked by reading the period of time-out time previously set corresponding to the specified area category (S203).

After the period of the time-out time until the doors are automatically locked is determined as described above, the main controlling section 107 determines whether a door is open based on input vehicle door open/close information (S204).

When it is determined that a door is open ("YES" in S204), it is determined that it is a user's typical sequential behavior pattern that the user unlocks the doors wirelessly, opens the door, and gets in the vehicle, and the one routine of this flow ends.

On the other hand, when it is determined that a door is not yet open even though the doors have been unlocked wirelessly ("NO" in S204), then, the main controlling section 107 determines whether the time-out time determined in S203 has passed since the door unlocking has been executed and completed based on the user request in S201 (S205).

When it is determined that the time-out time has not passed since the door unlock has been completed ("NO" in S205), the process goes back to S204 and waits for a vehicle door open operation until the time-out time determined in S203 has passed (namely, until "YES" in S205).

After the wireless doors unlocking based on the user's request is executed and completed and the vehicle doors are unlocked, when the time-out time determined in S203 has passed without detecting the door opening operation ("YES" in S205), the main controlling section 107 determines that it is not desirable if the unlocked status of the vehicle doors continues for a longer period than this and gives an instruction to the door lock mechanism controlling section 106 to lock the doors (S206).

As described above, in this embodiment, when a door is not opened until the time-out time determined based on the own vehicle current position has passed from when the wireless doors unlocking is executed and completed, the doors are automatically locked without depending on the user's operation to secure the security of the vehicle.

After such an automatic door locking is executed (S206), the main controlling section 107 determines whether the user requests a door unlocking operation using the wireless key within a prescribed time period after the automatic door locking is executed and completed (S207).

When there is no request to unlock the doors wirelessly within a relatively short prescribed time period after the automatic door locking is completed ("NO" in S207), the main controlling section 107 determines that the wireless doors unlocking request detected in S201 is caused by an error in operation such as wrong pressing and that the user is satisfied with the current status that the vehicle doors are locked and the security of the vehicle is secured; then the one routine of this flow ends.

On the other hand, when there is a doors unlocking request issued wirelessly from the user within the prescribed time period after the automatic doors locking is executed and completed (S206), the main controlling section 107 determines that the period of the time-out time determined based on the own vehicle current position in S203 is too short, in other words, that the user wishes that the time-out time has a longer period, learns that the own vehicle current position should have a longer period of the time-out time than a normal time-out time previously determined based on the area category including the own vehicle current position, and stores the learned information in the map information stored and held in the storage section 105 as customized information (S208).

As described, when the doors are unlocked wirelessly again right after the doors has been automatically locked, the vehicle position at the time is accumulated as learned data. Then, for example, the period of the time-out time when the own vehicle is parked at the learned position or in the vicinity (for example, in a circular area having a prescribed radius from the learned position) is set longer than that previously set based on the area category.

As described, according to the embodiment of the present invention, the period of the time-out time from when the doors are unlocked wirelessly until the doors are locked according to the automatic doors locking function is changed according to the position of the vehicle then. Therefore, it is possible to reduce the period of the time-out time as long as security permits while sufficient vehicle security is secured by setting the period of the time-out time so as to have a necessary and sufficient period for the security in light of the situation surrounding the vehicle. As a result, it becomes possible to achieve a good balance between assurance of the security of the vehicle and the user's convenience.

Further, according to an embodiment of the present invention, depending on whether a user requests to unlock the doors wirelessly within a prescribed time after the automatic doors locking is completed, it is determined whether the period of the time-out time determined based on the own vehicle current position at the time is appropriate for the user. Then, when it is determined that the period of the time-out time is not necessarily appropriate for the user, it is learned that the period of the time-out time with respect to the vehicle position is to be extended. Further, by accumulating the learned data by repeating such learning, a desired period of the time-out time for the user can be realized.

It should be noted that in the above embodiment, the period of the time-out time in daytime when the security level is relatively lower in the same place may be set longer than that in nighttime by considering not only the own vehicle current position but also the time at which the doors are unlocked wirelessly.

Still further, in the above embodiment, based on insight that a risk where surrounding movements fluctuate greatly is relatively higher and the risk where nobody is around is relatively lower, the period of the time-out time may be increased or reduced depending on the peripheral situation such as the number of people around, the number of people passing by, the number of vehicles, the number of vehicles passing by, or an amount of image change by way of image recognition or image processing using a peripheral monitoring camera in a prescribed period of time after the doors are unlocked.

In this case, preferably, an operator who has unlocked the doors is excluded by detecting the direction of the operator who unlocked the doors using an in-vehicle array antenna and a wireless key including the GPS. By doing this, a locking operation in a short period of time due to the movement of the operator who unlocked the doors can be avoided. Obviously, the period of time-out time may be extended as long as the movement of the operator who unlocked the doors is being detected.

Still further, in the above embodiment, to avoid unintended locking of doors even though a user is going to get in the vehicle, by maintaining communications between the wireless key and a receiver for a certain period of time after the doors are unlocked, and when the radio field intensity from the wireless key is equal to or more than a prescribed level or is increasing in trend, the period of time-out time may be extended. Herein, instead of the radio field intensity, the GPS may be included in the wireless key so as to detect that the distance to the vehicle is being approached.

Still further, in the above embodiment, as an example where the map information is classified into plural area categories depending on the required security level, the map information is classified into category 1: a nearby area of the user's own house; category 2: station vicinity areas; category 3: downtown areas; and category 4: other areas. However, the present invention is not limited to such an embodiment. For example, by focusing on the facilities where the vehicle is parked, the map information may be classified in more detail, based on the type and attributes of the facilities, into category 1: police stations, fire stations, and the like; category 2: government and other public offices, schools, cemeteries, and the like; category 3: parks, department stores, and the like; category 4: convenience stores, game arcades, facilities for playing Japanese pinball game (Pachinko), and the like.

In addition, preferably, different area classifications depending on countries are used, because people in different countries have different ways of thinking about security. Further, it is preferable that a common apparatus be provided so that the apparatus can correspond to the classifications of each country by changing the setting.

Still further, in the above embodiment, as an example, it is assumed that there is a wireless key system where the doors are locked/unlocked in accordance with the wireless key operation. However, the present invention is not limited to this embodiment. Even when a vehicle has a timed lock mechanism, and the doors of the vehicle are locked/unlocked using a mechanical key, the present invention may be also applied to the vehicle.

Industrial Applicability

The present invention may be applied to a vehicle door lock control apparatus mounted in a vehicle for locking and unlocking the closed doors according to a user's operation regardless of the type of source of power, type of fuel, exterior design, weight, size, driving performance, and the like.

The present application claims priority from Japanese Patent Application No. 2006-271993 filed on Oct. 3, 2007, the entire contents of which are hereby incorporated herein by reference.

The invention claimed is:

1. A vehicle door lock control apparatus mounted in a vehicle for locking and unlocking the closed doors according to a user's operation, comprising:

an automatic door locking unit locking the doors when no operation of opening the vehicle door is detected within a prescribed period of time-out time after the doors are unlocked by the user; and a time-out time determining unit detecting own vehicle position and determining the prescribed period of time-out time based on own vehicle position information.

2. The vehicle door lock control apparatus according to claim 1, wherein the time-out time determining unit checks the detected own vehicle position against map information so as to estimate a required security level at the position, and determines the prescribed period of time-out time based on the estimated security level.

3. The vehicle door lock control apparatus according to claim 2, wherein the time-out time determining unit previously classifies the map information into plural area types depending on the differences of the security levels, assigns a different time period value to each of the plural area types, detects own vehicle position, specifies the area type with respect to the position by checking the detected own vehicle position against the map information, and determines the prescribed period of time-out time by reading the time period value assigned to the specified area type.

4. The vehicle door lock control apparatus according to claim 1, wherein the time-out time determining unit, when the user unlocks the door within a prescribed period of time after the doors are locked by the automatic door locking unit, memorizes an own vehicle position at that time as a position whose prescribed time-out time is to be extended.

5. The vehicle door lock control apparatus according to claim 4, wherein the time-out time determining unit sets the prescribed period of time-out time when it is determined that the own vehicle is positioned in a prescribed area including the position whose prescribed time-out time is to be extended based on the detected own vehicle position longer than the prescribed period of time-out time when it is determined that the own vehicle is in an area other than the prescribed area based on the own vehicle position.

6. The vehicle door lock control apparatus according to claim 5, wherein the time-out time determining unit sets the prescribed period of time-out time when it is determined that the user unlocks the doors in daytime longer than the prescribed period of time-out time when it is determined that the user unlocks the doors in nighttime.

7. The vehicle door lock control apparatus according to claim 1, wherein the user requests to lock or unlock the doors by a wireless key operation;

the automatic door locking unit locks the doors when no operation for opening the vehicle doors is detected within a prescribed period of time-out time after the doors are unlocked based on the request from the user; and the time-out time determining unit detects the own vehicle position when the user requests to unlock the door and determines the prescribed period of time-out time based on the detected own vehicle position.

8. The vehicle door lock control apparatus according to claim 1, wherein the time-out determining unit detects own vehicle position when the user unlocks the door and determines the prescribed period of time-out time based on the detected own vehicle position.

* * * * *

UNITED STATES PATENT AND TRADEMARK OFFICE
CERTIFICATE OF CORRECTION

PATENT NO. : 8,314,680 B2
APPLICATION NO. : 12/281389
DATED : November 20, 2012
INVENTOR(S) : Masaaki Ichihara It is certified that error appears in the above-identified patent and that said Letters Patent is hereby corrected as shown below:

In the Specifications:

Column 8, line 60, change "Oct. 3, 2007" to --Oct. 3, 2006--;

Signed and Sealed this
Thirtieth Day of April, 2013

Teresa Stanek Rea
*Acting Director of the United States Patent and Trademark Office*